United States Patent Office 2,742,445
Patented Apr. 17, 1956

2,742,445

STYRENE MODIFIED ALKYD RESINS FROM 5-TERTIARY BUTYL ISOPHTHALIC ACID

Funston G. Lum, Richmond, Calif., assignor to California Research Corporation, San Francisco, Calif., a corporation of Delaware No Drawing. Application June 24, 1954,
Serial No. 439,164

5 Claims. (Cl. 260—45.4)

This invention relates to resinous compositions prepared by polymerizing a soluble, fusible reactive or base resin of the alkyd type with a vinyl monomer reactive solvent to produce an insoluble, infusible resin.

Unsaturated polyester resins obtained by the reaction of a polyhydric alcohol, e. g., ethylene glycol, and an unsaturated aliphatic polybasic acid, e. g., maleic or fumaric, a portion of which is replaced with a saturated polybasic acid, e. g., phthalic, are known. It is also known that these resins may be desirably modified by admixing with a solubilizing vinyl monomer, e. g., styrene which later can be made to react with the unsaturated polyester resin to produce an infusible, insoluble resinous composition. Illustrative of the preparation and description of such resins may be had, for example, from U. S. Patents Nos. 2,516,309 and 2,409,633.

It has now been found in accordance with the invention that superior modified alkyd resins may be prepared from a vinyl monomer, e. g., styrene, and an alkyd unsaturated polyester base resin obtained by the condensation of a polyhydric alcohol, an unsaturated aliphatic polybasic acid, such as maleic or fumaric, and 5-tertiary-butylisophthalic acid employed in place of the ordinary phthalic acids.

The use of 5-tertiary-butylisophthalic acid as the saturated polybasic acid component in the preparation of the resin results in a reactive or base resin and a finished resinous composition which have unexpected or unpredictable advantages. It has thus been discovered that the solubility or compatibility properties of the base resin in the vinyl monomer are considerably improved. For example, maleic acid-ethylene glycol polyester resins containing an equivalent of the aforesaid acid to the maleic acid have been found to be compatible in all proportions with styrene. This is particularly advantageous since the use of ethylene glycol, being a diprimary alcohol, effects a smooth, rapid esterification. Another important advantage of the resins contemplated by the invention resides in their unexpectedly lowered densities, as a result of which, the cost of the resins on a weight basis is reduced. The 5-tertiary-butylisophthalic acid may conveniently and economically be prepared by the oxidation of 5-tertiary-butyl meta-xylene derived by tertiary butylation of meta-xylene.

In the preparation of the resinous compositions of the invention, known methods of producing the modified alkyd type resins are satisfactory. Thus, the polyester base or reactive resin is prepared by the esterification of preferably an alpha, beta-unsaturated acid with a polyhydric alcohol, preferably a glycol, desirably under an inert atmosphere, the reaction being continued until the acid number is below about 50. The resulting unsaturated polyester is then mixed with the vinyl monomer and a polymerization inhibitor added, if desired. Curing the resin may be effected by subjecting it to polymerization conditions, such as heat, light, or a combination of these, in the presence of a polymerization catalyst.

As an illustration of the practice of the invention, the following examples are given, the parts being by weight:

EXAMPLE 1

27.5 parts of ethylene glycol and 45 parts of tertiary-butylisophthalic acid were heated under an inert atmosphere of nitrogen at a temperature of 205–210° C. in a vessel provided with a steam-jacketed condenser for removal of the water of condensation. After two hours the vessel and contents were cooled to 140° C. before adding 23.3 parts of fumaric acid. The mixture was heated to a temperature of 200° C., and maintained at this temperature until the acid number was reduced to 25, i. e., for 2¼ hours. The reaction mixture was again cooled, and, as stabilizer, 0.008 part of tertiary butyl catechol was added. A hard, brittle resinous composition at room temperatures was obtained. This was comminuted and mixed with styrene in the proportions of 65 parts resin and 35 parts styrene. The 65% in styrene solution had a viscosity of 0 (Gardner-Holdt).

EXAMPLE 2

24.4 parts ethylene glycol, 17.6 parts maleic anhydride and 39.8 parts tertiary-butylisophthalic acid were heated, as in Example 1, at a temperature of 215–220° C. for a period of 9 hours, to an acid number of 25–30. The resinous mixture was cooled and stabilized, resulting in a hard, brittle resin. A portion of the hard, brittle resin was dissolved in styrene to yield a 60% in styrene solution, having a viscosity T (Gardner-Holdt; and another portion to yield a 50% in styrene solution, having a viscosity D–E (Gardner-Holdt). The solutions were then cured employing benzoyl peroxide as the catalyst. Hard, insoluble and infusible products were obtained.

EXAMPLE 3

22.2 parts diethylene glycol, 15.8 parts maleic anhydride, and 9.4 parts tertiary-butylisophthalic acid were heated, as in Example 1, at a temperature of 215–220° C. for 8 hours and to an acid number of 35. The unsaturated polyester composition was worked up as in Example 1, and a resin gummy at room temperatures was obtained. Styrene solutions of 70, 60 and 50% were formed and their viscosities were determined to be, respectively, Y+, S–T, and E–F (Gardner-Holdt).

A number of resins were prepared employing the procedure outlined in the foregoing examples. Materials and amounts, together with properties of the unsaturated polyester reactive resin and of the finished cured resinous composition are tabulated below.

*Properties of 5-tertiary-butylisophthalic (TBIPA), isophthalic (IPA), and phthalic anhydride (PA) modified unsaturated polyesters*

| Runs | Dibasic Acid | Unsaturated Acid | Glycol | Resin Composition | | Compatibility with Styrene (Percent Styrene) | Specific Gravity of Cured Resin | |
|---|---|---|---|---|---|---|---|---|
| | | | | Unsaturated (Mole Ratio) | Saturated (Weight Ratio) | | (Percent Styrene) | Specific Gravity |
| 1 | TBIPA | Maleic | Ethylene | 50:50 | 36:64 | All proportions | 25 / 40 / 50 | 1.19 / 1.18 / 1.16 |
| 2 | IPA | do | do | 50:50 | 43:57 | 30–35 [1] | 25 | 1.29 |
| 3 | TBIPA | Fumaric | do | 50:50 | 36:64 | All proportions | 35 / 25 | 1.18 / 1.32 |
| 4 | IPA | do | do | 75:25 | 69:31 | 30–35 [1] | 35 | 1.31 |
| 5 | IPA | do | do | 50:50 | 43:57 | 30–35 [1] | 25 | 1.30 |
| 6 | IPA | do | do | 25:75 | 20:80 | 30–35 [1] | 25 | 1.29 |
| 7 | PA | do | do | 50:50 | 43:57 | 30–35 [1] | 50 | 1.19 |
| 8 | TBIPA | Maleic | Diethylene | 79:21 | 71:29 | 80 | 50 | 1.21 |
| 9 | IPA | do | do | 79:21 | 75:25 | 50–55 | | |
| 10 | PA | do | do | 79:21 | 75:25 | 45–50 | | |

[1] Many solutions of these resins are cloudy even below this styrene range, where actual separation was observed.

From the table it will be noted that the unsaturated polyester prepared with tertiary-butylisophthalic acid, runs 1 and 3, was miscible in all proportions with styrene. When isophthalic and phthalic acid were employed in equivalent amounts compatibility of the unsaturated resin was considerably lower, that is, the resin was miscible with styrene in the range 30–35%, runs 2, 5 and 7. Also varying the mole ratio of unsaturated to saturated acid did not improve styrene compatibility of the phthalic and isophthalic prepared resins, runs 4 and 6. Similar improvement is noted when diethylene glycol was employed in place of ethylene glycol, as will be seen from runs 8, 9 and 10. It will also be noted that resin compositions prepared with tertiary-butylisophthalic acid resulted in a cured resin of lower specific gravity, as shown, for example, in runs 1, 2 and 7. A 25% styrene solution of tertiary-butylisophthalic acid resin gave a specific gravity of 1.19 as against 1.29 for 25% styrene solutions of isophthalic and phthalic acid resins, runs 2 and 7. It is also seen that increasing styrene content, which is now made possible by the instant invention, further decreases specific gravity as shown in run 1. It should be pointed out that in all the runs 1.10 moles ethylene glycol was used per mole of total acid, unsaturated and saturated. Diethylene glycol on the other hand, because of its lower volatility, was used in a mole ratio of 1.03 to 1 of total acid.

In carrying out the invention it is preferred generally to employ an excess of the polyhydric alcohol over the acid, thus helping to reduce the acid number during polymerization. A 3 to 10% stoichiometric excess of glycol over the acid material employed has been found satisfactory.

The tertiary-butylisophthalic acid is employed in amounts ranging from 1 mol to 4 mols of unsaturated acid to 4 mols of tertiary-butylisophthalic acid per mol of unsaturated acid, i. e., in the small amount of 1 mol of 5-tertiarybutyl isophthalic acid for 4 mols of the unsaturated acid, to as much as 4 mols of 5-tertiarybutyl isophthalic acid for each mol of unsaturated acid.

As will occur to those skilled in the art, the unsaturated polyester may also be modified with other acids, such as succinic acid and its anhydride, adipic acid, azelaic acid, sebacic acid, etc.

Suitable glycols are the mono- and polyglycols, such as ethylene glycol, propylene glycol, diethylene glycol, triethylene glycol. As is known in the art a small amount of higher functional polyhydric alcohols, such as glycerol and pentaerythritol may be employed in place of the aforementioned glycols.

As examples of the vinyl monomer, in addition to the preferred styrene, may be mentioned other aryl mono-olefins, such as ring-substituted styrenes, for example, mono- and poly-alkyl styrenes, mono- and poly-chloro styrenes, in which the alkyl and chlorine radicals are substituted on the ring, etc. Also suitable are other vinyl type compounds, such as vinyl esters, ketones and ethers; vinylidene halides, acrylic acid and its derivatives, e. g., amides, esters and nitriles. Other unsaturated monomers which can be employed in accordance with the invention are the diallyl esters of a saturated dibasic acid and the substituted allyl esters, for example, diethallyl, and dimethallyl esters. Specific examples are diallyl phthalate, diallyl adipate, sebacate, glutarate, etc.

The resinous compositions prepared in accordance with the invention are particularly useful as glass laminating resins, and the like.

Obviously many modifications and variations of the invention, as hereinbefore set forth, may be made without departing from the spirit and scope thereof and, therefore, only such limitations should be imposed as are indicated in the appended claims.

I claim:

1. Resinous composition prepared in accordance with claim 5.

2. The improvement according to claim 5 wherein the unsaturated polybasic acid is maleic acid.

3. The improvement of claim 2, wherein the polyhydric alcohol is ethylene glycol.

4. Resinous composition prepared in accordance with claim 3.

5. In the process of preparing modified unsaturated polyester resins by the copolymerization of styrene with a base resin derived from the polymerization of a polyhydric alcohol with both an aliphatic alpha, beta ethylenically unsaturated dicarboxylic acid and a benzene dicarboxylic acid, the improvement of increasing the compatibility of the styrene and base resin which comprises employing as the benzene dicarboxylic acid 5-tertiarybutyl isophthalic acid in an amount ranging from about 1 mol for 4 mols of the aliphatic alpha, beta ethylenically unsaturated dicarboxylic acid to 1 mol per mol of the aliphatic alpha, beta ethylenically unsaturated dicarboxylic acid.

References Cited in the file of this patent

UNITED STATES PATENTS

| 2,446,314 | Wagers | Aug. 3, 1948 |
| 2,632,753 | Anderson | Mar. 24, 1953 |
| 2,664,413 | Parker | Dec. 29, 1953 |
| 2,680,105 | Baker | June 1, 1954 |

OTHER REFERENCES

Nightingale et al.: J. Am. Chem. Soc., 64, 1662–1665 (July 1942), especially note page 1664.